United States Patent Office 3,692,492
Patented Sept. 19, 1972

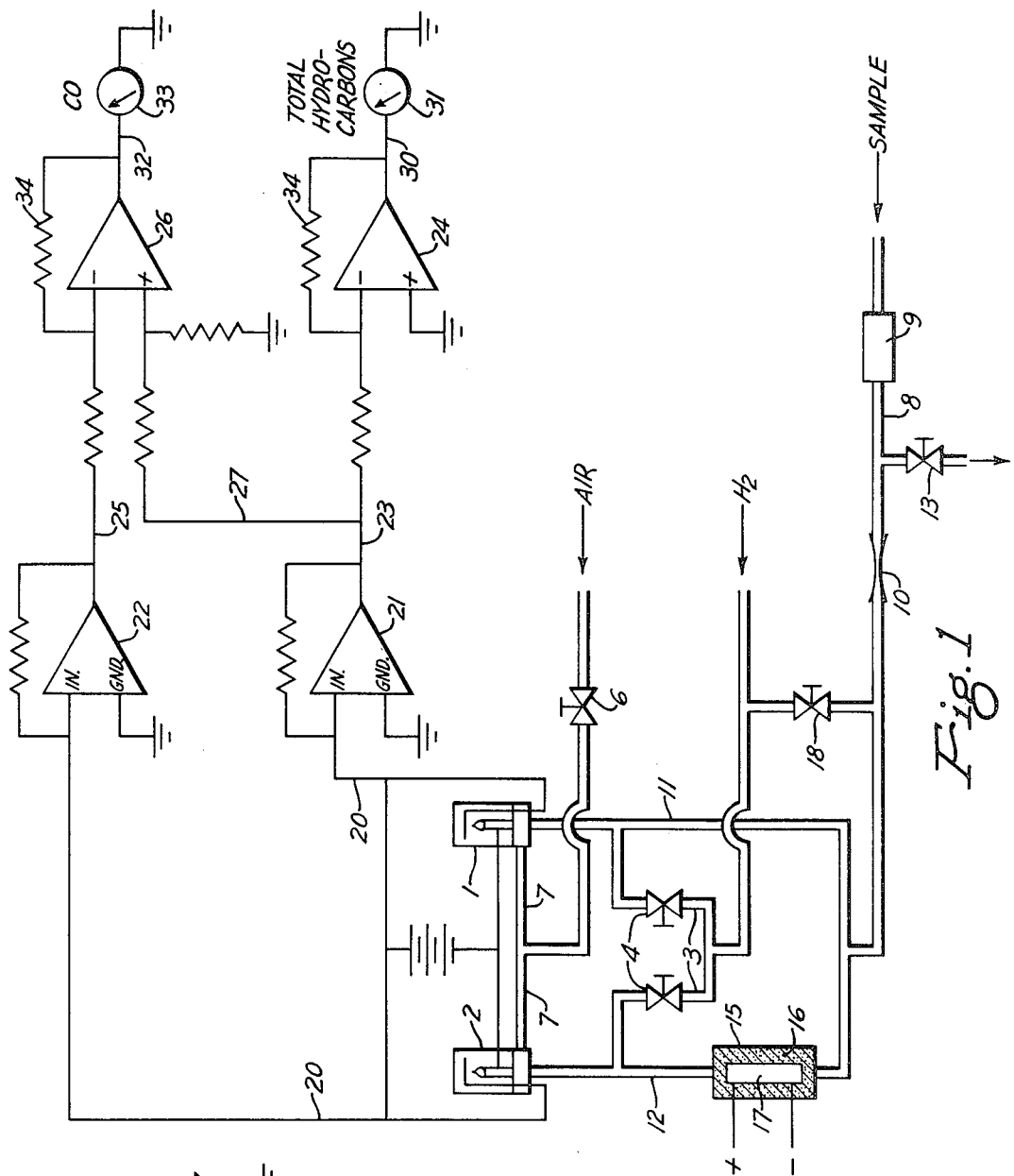
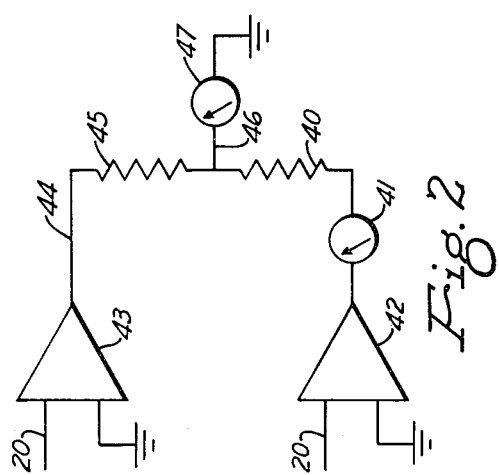

3,692,492
APPARATUS FOR MEASURING CARBON MONOXIDE AND TOTAL HYDROCARBONS IN GAS SAMPLE
Albert A. Poli, Jr., and Sidney D. Delaune, Pittsburgh, Pa., assignors to Mine Safety Appliances Company, Pittsburgh, Pa.
Filed Feb. 8, 1971, Ser. No. 113,548
Int. Cl. G01n 25/00, 25/22
U.S. Cl. 23—254 E                           10 Claims

ABSTRACT OF THE DISCLOSURE

First and second means for measuring hydrocarbons in a gas sample are provided. A conduit delivers part of the sample to the first means, and a second conduit delivers the rest of the sample to the second means at the same time. In the second conduit there is a reactor for converting carbon monoxide to methane, so the portion of the sample delivered by the second conduit will contain a greater amount of hydrocarbons than the part delivered by the first conduit.

Air pollution studies require monitoring of carbon monoxide and total hydrocarbons in many different locations. The amount of either pollutant can vary greatly from place to place, so a wide range instrument is necessary for the measurements. Such an instrument that will measure total hydrocarbons but not carbon monoxide is known. It is a hydrogen flame analyzer in which the air being sampled is delivered to a flame of pure hydrogen. Any hydrocarbons carried into the flame result in the ionization of carbon atoms. An electrical potential across the flame, and an ion collector electrode supported above the flame, produce an electric current proportional to the hydrocarbon count. This is measured by an electrometer circuit, the output signal from which will indicate the total hydrocarbons in the sample. As mentioned above, however, hydrogen flame analysis has not revealed the presence of carbon monoxide heretofore.

It is among the objects of this invention to provide apparatus for simultaneously measuring the amount of carbon monoxide and total hydrocarbons in a gas sample, which has a wide range and which can make such measurements on a continuous basis.

The preferred embodiment of the invention is illustrated in the accompanying drawings, in which FIG. 1 is a schematic view of our apparatus; and FIG. 2 is a fragmentary schematic view of a modification.

Referring to FIG. 1 of the drawings, a pair of hydrogen flame burners 1 and 2, such as used in hydrogen flame analysis, are provided. Each burner has an inlet for hydrogen connected by a line 3 to a suitable hydrogen source. The two lines may be provided with valves 4. Combustion air for the burners is supplied through a valve 6 and lines 7 leading to the bases of the two burners. A gas sample line 8 conducts a sample through a filter 9 and a capillary 10 and then through two branch conduits 11 and 12, each of which leads to the hydrogen inlet of a burner. The sample line 8 may be provided with a back pressure regulator 13.

Conduit 11 goes directly to burner 1, but it is a feature of this invention that the other conduit 12 contains a reactor, in which carbon monoxide in the sample is converted into methane. The reactor may consist of a housing 15 packed with a suitable catalyst 16, such as fine mesh nickel, with an electric heater 17 in the bed for promoting the reaction. The reaction also can be promoted by hydrogen that is led into sample line 8 from the hydrogen line through a valve 18. Consequently, total hydrocarbons in the gas sample are delivered to both burners, but to one of them are added the hydrocarbons that are supplied by the methane due to converting the carbon monoxide to methane. The system should be designed so that the sample stream from line 8 divides equally into conduits 11 and 12. If not, means to calibrate the system to compensate for unequal flow into the two conduits will have to be provided.

The collector of each burner is electrically connected by a wire 20 to the positive input terminal of an electrometer for measuring the hydrocarbons in the part of the sample delivered to the associated burner. Burner 1 is connected in this way to electrometer 21, and burner 2 is connected to electrometer 22. Both electrometers have conventional range resistors. The analysis signal produced by each electrometer as a result of measuring the electrical potential across the flame of the associated burner is connected to an amplifier. Thus, electrometer 21 is connected by a wire 23 to the negative input terminal of an amplifier 24, while the other electrometer is connected by a wire 25 to the negative input terminal of an amplifier 26. Another wire 27 connects wire 23 with the positive input terminal of amplifier 26. This positive terminal also is grounded.

The output signals of the amplifiers can register on meters or recording devices. Accordingly, a wire 30 may connect the output of the amplifier 24 with a meter 31, and a wire 32 connect the output of the other amplifier to a second meter 33. A resistor 34 is shunted from the negative input terminal of each amplifier to its output to produce a gain of one.

The first amplifier 24 will cause meter 31 to indicate the total hydrocarbons in the gas sample. However, the electric circuit is such that the signal from the first electrometer 21 is substracted from the greater signal from the second electrometer, so the output of amplifier 26 will cause meter 33 to indicate only hydrocarbons due to the methane converted from the carbon monoxide in the sample. Since the methane was converted from carbon monoxide, the amount of carbon monoxide in the sample can be shown, such as by calibrating the meter for carbon monoxide. In other words, the first meter 31 indicates total hydrocarbons but the second meter indicates total hydrocarbons plus the hydrocarbons due to the methane converted from carbon monoxide minus total hydrocarbons, so that only the hydrocarbons due to the methane just mentioned register. The read-out instruments connected to the two amplifiers therefore can show simultaneously the total hydrocarbons and the amount of carbon monoxide in the gas sample, whether it is a batch sample or a continuous sample.

Since the principal feature of this invention involves converting carbon monoxide to methane so that one conduit carries more hydrocarbons than the other, the invention still can be practiced if hydrocarbon detecting means other than hydrogen flame detectors are used.

In the modification shown in FIG. 2, the amplifiers have been omitted. An electrical resistor 40 is connected in series with a meter 41 and the output of an electrometer 42 that is connected with the hydrogen flame detector that receives the part of the gas sample in which carbon monoxide is not converted to methane. The output of the other electrometer 43 is connected by a wire 44 with a resistor 45. The resistance values of the two resistors are the same. The resistors are connected by a common wire 46 to a meter 47 or the like.

The first meter 41 indicates total hydrocarbons in the sample. The other meter indicates only the hydrocarbons resulting from converting carbon monoxide to methane. This is because the current flowing through resistor 40 cancels an equal amount of the current flowing through the other resistor, thereby leaving only the current that is a measure of the hydrocarbons due to the methane. This remaining current operates meter 47 to show the amount of carbon monoxide in the sample.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Apparatus for simultaneously measuring the amount of carbon monoxide and total hydrocarbons in a gas sample, comprising first and second means for measuring hydrocarbons, a conduit for delivering part of the sample to said first means, a second conduit for simultaneously delivering the rest of the sample to said second means, and a reactor in the second conduit for converting carbon monoxide to methane, whereby the portion of the sample delivered by the second conduit will contain a greater amount of hydrocarbons than the part delivered by the first conduit.

2. Apparatus according to claim 1, in which said reactor includes a catalytic bed, means for heating the bed, and means for supplying the bed with hydrogen.

3. Apparatus according to claim 1, in which said measuring means include a pair of hydrogen flame burners, and each burner is connected with a different one of said conduits for receiving gas therefrom.

4. Apparatus according to claim 1, in which said measuring means include means for indicating the total hydrocarbons in the part of the sample delivered by the first conduit, and means for indicating only the hydrocarbons due to the methane converted from the carbon monoxide in the part of the sample delivered by the second conduit.

5. Apparatus according to claim 1, in which said measuring means include means for detecting and indicating the total hydrocarbons in the part of the sample delivered by the first conduit, means for detecting all of the hydrocarbons in the part of the sample delivered by the second conduit, and means for indicating the result of subtracting the amount detected by the first detecting means from the amount detected by the second detecting means.

6. Apparatus according to claim 1, in which said measuring means include means for creating electric signals proportional to the amount of hydrocarbons in the gas sample delivered by each conduit, means for measuring the smaller signal, means for subtracting the smaller signal from the larger one, and means for measuring the remainder to indicate the amount of hydrocarbons due to the methane converted from the carbon monoxide in the sample delivered by the second conduit.

7. Apparatus according to claim 1, in which said measuring means include means for creating electrical signals proportional to the amount of hydrocarbons in the gas sample delivered by each conduit, the smaller signal being negative and the larger signal positive, a pair of series connected electrical resistors of equal resistance value, means connecting the smaller signal with one of the resistors, means connecting the larger signal with the other resistor, whereby the smaller signal is subtracted from the larger one, a meter in the connecting means for the smaller signal for measuring that signal, and a meter connected between the two resistors and to ground for measuring the difference between the two signals.

8. Apparatus for simultaneously measuring the amounts of carbon monoxide and total hydrocarbons in a gas sample, comprising first and second hydrogen flame burners, a conduit for delivering part of the sample to the first burner, a second conduit for simultaneously delivering the rest of the sample to the second burner, a reactor in the second conduit for converting carbon monoxide to methane, first and second electrometers for measuring the electrical conductivity of the first and second burner flames respectively, means operated by the first electrometer for indicating total hydrocarbons in the sample delivered to the first burner, and means operated by the second electrometer and controlled by the first electrometer for indicating only the hydrocarbons due to the methane from converting the carbon monoxide in the sample delivered to the second burner.

9. Apparatus according to claim 8, in which said means operated by the electrometers are first and second amplifiers having positive and negative input terminals, means for conducting the signal from the second electrometer to one of the input terminals of the second amplifier, means for conducting the signal from the first electrometer to the other input terminal of the second amplifier and to the input terminal of opposite polarity of the first amplifier, whereby the signal from the first electrometer will cancel out the portion of the signal to the second amplifier that is due to hydrocarbons other than methane converted from the carbon monoxide in the sample, and means for indicating the output of each amplifier.

10. Apparatus for simultaneously measuring the amounts of carbon monoxide and total hydrocarbons in a gas sample, comprising first and second hydrogen flame burners, a conduit for delivering part of the sample to the first burner, a second conduit for simultaneously delivering the rest of the sample to the second burner, a reactor in the second conduit for converting carbon monoxide to methane, first and second electrometers for measuring the electrical conductivity of the first and second burner flames respectively, a meter connected with the output of the first electrometer, a pair of electrical resistors of equal resistance value connected in series between said meter and the output of the second electrometer, and a second meter connected between the two resistors and to ground.

References Cited

UNITED STATES PATENTS

| | | | |
|---|---|---|---|
| 3,168,378 | 2/1965 | Maresh et al. | 23—230 |
| 3,236,603 | 2/1966 | Durrett et al. | 23—254 |
| 3,545,929 | 12/1970 | Linnenbom et al. | 23—230 |

MORRIS O. WOLK, Primary Examiner

R. E. SERWIN, Assistant Examiner

U.S. Cl. X.R.

23—232 E, 255 E